United States Patent [19]

Brna et al.

[11] Patent Number: 4,792,457

[45] Date of Patent: Dec. 20, 1988

[54] METHOD FOR MANUFACTURING INDIVIDUALLY WRAPPED MEAT SLICES

[75] Inventors: Miro A. Brna, Park Ridge; Robert G. Walker, Glenview; Charles Kukla, Broadview, all of Ill.

[73] Assignee: Kraft, Inc., Glenview, Ill.

[21] Appl. No.: 944,415

[22] Filed: Dec. 19, 1986

[51] Int. Cl.$^4$ .............................................. A22C 11/00
[52] U.S. Cl. ................................ 426/574; 426/129; 426/412; 426/414; 426/578; 426/646; 53/440; 53/550
[58] Field of Search .............. 426/129, 414, 412, 108, 426/646, 574, 578; 53/550, 440

[56] References Cited

U.S. PATENT DOCUMENTS

2,070,850  2/1937  Trabold ........................... 426/412
4,071,635  1/1978  Lindl et al. ..................... 426/646

Primary Examiner—Steven Weinstein
Assistant Examiner—Mary S. Mims
Attorney, Agent, or Firm—Fitch, Even, Tabin & Flannery

[57] ABSTRACT

A method is disclosed for continuously manufacturing individually wrapped, single slice, firm bodied meat products formed of a viscous heat settable non-syneresing meat emulsion which contains a heat-settable starch.

9 Claims, 4 Drawing Sheets

METHOD FOR MANUFACTURING INDIVIDUALLY WRAPPED MEAT SLICES

The present invention is directed to methods and apparatus for the manufacture of packaged food products for consumer use. More particularly, the present invention relates to pasteurized, form stable individually wrapped meat slices having extended refrigerator shelf life, as well as methods and apparatus for producing such individually wrapped meat slices.

Processed meat products such as luncheon meats are conventionally prepared and packaged in either relatively large, unsliced bulk form, or in the form of multiple slices stacked together which are surrounded by an overwrap of packaging material. Such processed meat products may be manufactured by preparing an emulsion of the desired processed meat constituents, together with flavoring agents or preservatives, forming the resulting emulsion in a desired shape such as a cylindrical shape, and heating the emulsion to at least an elevated, coagualtion temperature to solidify or pasteurize the meat mass. While heat settable meat emulsions typically utilize natural meat components, meat analog products which utilize a heat setting vegetable protein are also known, as disclosed in U.S. Pat. No. 4,052,517 relating to meat analog products containing cottonseed protein. The conventionally prepared heat-solidified meat or meat analog product may subsequently be sliced and packaged in accordance with conventional practic. Such slicing and/or packaging may degrade the keeping quality of the meat product. Moreover, upon opening a package of the sliced product, the continuing freshness or shelf-life of the product is difficult to maintain.

As disclosed in U.S. Pat. No. 3,599,560, methods are also known for preparing continuous ribbons of cooked meat emulsion products by direct electrical resistance cooking of the emulsion in electrical contact with the face of an electrically conductive roller. However, such methods suffer the disadvantages of requiring cutting and stacking of the product. Cutting and stacking of exposed slices may introduce microbial contamination, and presents cleaning and hygenic difficulties in manufacturing operations.

Methods and apparatus for manufacturing individually wrapped, single slice meat products in which the package completely surrounds add hermetically seals the meat product slice so that it may be stacked with other slices without adjacent slices coming into direct contact with each other would be desirable. Such individually wrapped meat product slices may be utilized by the consumer without contaminating adjacent slices, which retain their storage stability. In addition, methods and apparatus in which the meat product is pasteurized within a single slice package so that the preservation of freshness of the slice may be maintained for an extended refrigeration shelf life period until it is used by the consumer, would also be desirable.

Accordingly, it is an object of the present invention to provide such methods and apparatus for manufacturing individually wrapped meat slices. These and other objects of the present invention will become more apparent from the following detailed description and the accompanying drawings of which

Generally in accordance with the present invention, methods and apparatusaare provided for manufacturing individually wrapped meat slices. The individually wrapped slices may desirably have extended refrigerator shelf life provided by pasteurization within hermetically sealed individual packages. The term "slice" is used broadly herein to include products in sheet form, however manufactured. The slice products in accordance with the present invention are prepared directly in sheet form, and are not physically cut into sheet form from a larger processed meat form.

In accordance with method aspects of the present invention, methods for manufacturing individually wrapped, single slice, firm bodied meat products from heat coagulatable meat emulsions are provided comprising the steps of preparing a viscous, heat settable meat emulsion, forming a longitudinally sealed substantially gas impervious packaging film tube, and introducing the meat emulsion into the packaging film tube. Further in accordance with the invention, the viscous heat settable meat emulsion is displaced from a cross sealing zone and the packaging film tube is transversely cross sealed to provide a sealed package, and the meat emulsion is heated while compressing at least two opposing sides of the package to heat set the meat emulsion contained in the sealed package to provide a firm bodied, heat coagulated single slice meat product intimately surrounded by and in conforming contact with a surrounding, sealed, substantially gas impermeable film package. The meat emulsion may be cooked in the sealed packaging film, and desirably is pasteurized to provide microbiological stability of the individual slices. The cooked slices are further desirably cooled while compressing at least two opposing sides of the sealed package to prevent distortion of the shape of the single slice meat product within the package. By substantially gas impermeable is meant that the packaging film is substantially free of pinholes and has a moisture vapor transmission rate (MVTR) of less than 0.9 grams of moisture per 100 square inches of the packaging film at atmospheric pressure at 100° F. and 90% relative humidity per 24 hours, and preferably less than about 0.4 grams/100 in 2/24 hours. A plurality of the individually wrapped slices may be stacked together and overwrapped with a substantially gas impermeable packaging film to provide a consumer package having excellent storage stability and convenience.

As indicated, in accordance with methods of the present invention, a viscous, heat-settable meat emulsion is prepared for further use in accordance with the method. By "heat settable" is meant that the meat product emulsion initially is a viscous, flowable form, is transformed into a form stable condition by heating the emulsion to a temperature of at least about 120° F. Desirably, "heat settable" meat product emulsions include a heat coagulatable protein component which provides the desired product form stability upon heat coagulation of the protein component. However, other heat settable compositions, such as those which include heat activated gel-forming agents such as hydrocolloids or hydrocolloid-protein blends, which form a firm, form-stable matrix upon heating, may be utilized.

The meat emulsion may desirably comprise at least about 5 percent by wight protein, and preferably in the range of from about 7 to about 16 weight percent of meat or vegetable protein, based on the total weight of the meat emulsion. The meat product emulsion may further desirably comprise at least about 5 percent animal or vegetable fat, and preferably in the range of from about 10 to about 50 percent fat by weight, based on the total weight of the meat emulsion product. The meat emulsion product may further comprise additional components including salt, sweeteners, extenders and binders, protective and preservation agents such as sodium ascorbate, sodium erythorbate, and sodium nitrite. Such additional processed meat components may be provided in accordance with conventional practice. It may also comprise from about 25 to about 65 weight percent total solids and from about 35 to about 75 weight percent of water, based on the total weight of the meat product emulsion. The heat-setting meat emulsion composition should desirably include a heat-activated starch composition system, as will be more fully described hereinafter.

The provision of sodium tripolyphosphate in the heat setting meat emulsion, typically in a range of from about 0.01 to about 0.5 weight percent, preferably about 0.05 weight percent based on the total weight of the emulsion, is also believed to provide important processing characteristics in the present processing methods. Sodium tripolyphosphateiincreases the emulsion stability and reduces fat and moisture separation during the cook operation. It is believed to enhance the binding of comminuted meats (water-binding) by specific interaction between the meat protein and the phosphate component. In addition, the phosphate component improves color retention and inhibits the development of rancidity.

The type of meat components which may be utilized in the meat emulsion of the present invention include beef, pork, poultry such as chicken and turkey, fish protein such as surimi, vegetable proteins such as soy protein and cottonseed protein, dairy protein such as milk solids, and microbial protein such as yeast protein. The heat-setting meat emulsion composition may be prepared by grinding, chopping and emulsifying the component ingredients to provide a substantially homogenous meat emulsion product. However, it is important that the particle size of the meat emulsion components be limited, and that the emulsion have stability and flow characteristics which facilitate cross sealing of the packaging film tube without substantial retention of meat fibers or other emulsion components in the cross seal zone, as will be more fully described. The utilization of water soluble, undenatured meat or vegetable proteins may be used to control the solids content in the preparation of a product having desired viscosity, water content and other emulsion properties. The viscosity of the meat emulsion should be suitable to permit the displacement of the meat emulsion from a cross sealing zone as will be described in more detail hereinafter.

It is desirable that the meat emulsion be non-syneresing, because the meat product emulsion components are substantially fully retained in the finished product slices. In coventional sausage manufacture, there may be, for example, up to 15 weight percent moisture loss during processing, but such moisture loss is undesirable in the present method because free moisture within the hermetically sealed package renders the product unappealing to the consumer. By "non-syneresing" is meant that upon heat coagulation of the meat product emulsion, free water is not substantially expressed from the meat emulsion product.

A non-syneresing, heat-coagulating meat emulsion may be provided by appropriate component selection such that the water content of the product is retained in the form stabilized slice product during cooking, cooling and product storage. A "non-syneresing" meat emulsion may desirably be provided by including in the meat emulsion composition a heat activatable starch product which does not substantially absorb water below its heat activation range, but which gels and absorbs water at or above such temperature range. In this regard, the heat activatable starch should desirably have a gelation temperature above the preparation temperature of the meat emulsion composition, and below the pasteurization temperauure utilized for processing of the heat-settable slices. Preferably, the gelation temperature of the heat activated starch composition will be in the range of from about 80° F. to about 180° F., and desirably will be in a range approximating or slightly below the coagulation temperature range of the meat emulsion, such as from about 110° to 130° F. Below the gelation temperature, the starch component maintains its solid, particulate form, and does not absorb substantial amounts of water from the meat emulsion composition. As the heat activated starch component is heated above its gelation temperature, the starch component dissolves in and effectively binds with a portion of the aqueous phase of the meat emulsion composition, thereby preventing or limiting syneresis within the hermetically sealed, individually wrapped meat slice package. The amount of heat-activatable starc utilized may be selected based on the water content and heat-setting properties of the emulsion composition, and in this regard may desirably be in the range of from about 0.5 to about 5 percent by weight based on the total weight of the meat emulsion. Typically, the meat emulsions utilized in accordance with the present invention may have a heat setting temperature in the range of from about 120° to about 140° F., particularly for heat-coagulatable meat based emulsions. It will be recognized that heat setting is a function of both time and temperature, and that as the temperature is increased above an effective minimum heat-coagulation temperature, the time decreases for substantially complete coagulation to occur. It will further be appreciated that cooking and pasteurization temperatures may be utilized which are substantially above the heat-setting temperature of the meat emulsion.

While in preferred embodiments of the present invention, processed meat slices of uniform composition are prepared, meat emulsions of different composition may be processed together to provide unitary processed meat slices having various geometries, such as multiple layers or zones combined to provide a unitary product having varigated appearance and/or flavor. Other products, such as processed cheese, may also be combined in such composite slices.

In the preparation of the meat emulsion, it is also desirable that the emulsion be deaerated to remove dissolved gases and bubbles which may be introduced into the product during the formation of the emulsion. In this regard, it is desirable that the emulsion be subjected to a vacuum of less than about 370 millimeters of mercury, absolute pressure, and preferably in the range of from about 70 to about 20 millimeters of mercury (e.g., 50 mm of mercury) in order to deaerate the emulsion. Because air may be introduced into the emulsion during chopping of the meat components, it is also desirable to carry out the chopping under vacuum conditions. The presence of air in the emulsion (including air which may come out of solution as the temperature of the emulsion is raised during processing) is particularly undesirable because it expands within the individual sealed film packages, to thereby adversely affect the package seals, and interferes with the package volume parameters.

In accordance with the invention, a longitudinally sealed packaging film tube is formed and the meat emulsion is introduced into the film tube. By "longitudinally sealed" is meant that the film tube is continuously sealed about a cross section through its longitudinal axis. Longitudinally sealed film tubes may be made by direct coextrusion of an organopolymeric film forming material in tubular form, or by sealing the edges of a suitable composite packaging film sheet in accordance with conventional practice. Such edge sealing techniques may include the formation of a lap seal, in which one side of the packaging film is formed into a tube and sealed to the opposite side of the packaging film material, or the formation of a fin seal in which the longitudinal edges of the same side of the packaging film material which is to contact the product to be wrapped, are sealed together to form an upstanding fin which may be folded over adjacent the packaging material. Such lap or fin sealing may be conventionally carried out by melting of an inner sealing layer of the packaging film material. The packaging film will desirably be a multilayer composite comprising one or more outer organopolymeric layers having a relatively high melting temperature, and one or more inner layers having a relatively low melting or softening temperature. Such films are readily provided in accordance with conventional practice, and should be selected to maintain tensile strength at elevated pasteurization temperatures.

Also in accordance with the invention, the meat emulsion is introduced into the longitudinally sealed filmtube. In this regard, the emulsion may be placed on the film before the film tube is longitudinally sealed, but is preferably extruded through a discharge nozzle at or internally of a zone of continuous film tube formation, to form a continuous, longitudinally sealed packaging film having the viscous, heat-settable meat emulsion enclosed therein. Desirably the tube and enclosed viscous, heat settable meat emulsion will be formed as a continuous sheet or ribbon having width generally corresponding to the width of the single slice meat product to be produced. The film tube may typically have a width in the range of from about 2 to about 5 inches and a thickness in the range of from about 1/16 the inch to about 3/16 this inch. Before cross sealing, the longitudinally formed film tube and the meat emulsion may be preheated to an elevated temperature in order to facilitate subsequent heat setting or pasteurization. However, the meat emulsion should remain at a temperature and time relationship below that at which it is substantially completely heat set before cross sealing, in order to prevent interference with cross seal formation. Such preheating may be carried out in any suitable manner such as by contacting the film tube with one or more heated surfaces or fluids, or by use of dielectric or microwave heating. However, it is noted that the heat setting of the meat emulsion may be a function of time as well as temperature, such that higher preheating temperatures may be used when the total duration before cross sealing is very short, such as under conditions of high operating speeds.

Also in accordance with the invention, the viscous heat settable meat emulsion is displaced from a cross sealing zone and the packaging film tube is transversely sealed at the cross sealing zone to provide a sealed package. The sealed package and the meat emulsion product contained therein are subsequently heated while compressing at least two opposed major sides of the sealed package, to heat set the meat emulsion. For heat-coagulatable meat emulsions, it is important that the individually wrapped meat emulsion package be heated under compression, because in the absence of compression, the meat emulsion coagulation may occur with an irregular shrinking along the width and length of the heat set emulsion, together with a corresponding increase in the thickness of the heat set emulsion, to produce a warped, irregularly shaped product which does not conform to the surrounding packaging film. It is desirable that the meat emulsion be subjected to a compressive force such as at least about five, and preferably at least about ten pounds per square inch. While the compression may be carried out by substantially flat, opposed parallel surfaces, it will be appreciated that the compression surfaces may also include various designs or emblems so that the finished product will be similarly engraved in its heat set form. It may also be desirable to similarly cool the pasteurized, heat-set meat emulsion slice packages under compression to maintain the form of the product without distortion.

It is particularly desirable in accordance with the present invention, that the meat emulsion may be pasteurized within the substantially hermetically sealed, individually wrapped single slice package. In order to accomplish such pasteurization, the meat emulsion should be heated to a pasteurizing temperature of at least about 152° F. and preferably at least 155° F. for at least about one second or equivalent time/temperature conditions.

The individually wrapped meat slices may be subsequently stacked and overwrapped with an additional packaging material to provide a consumer product having extended shelf life, convenience and freshness.

Further in accordance with the present invention, apparatus for manufacturing individually wrapped single sliced processed meat products is provided comprising means for forming a longitudinally sealed packaging film tube, and for introducing a heat settable, non-syneresing, meat emulsion into the film tube, means for displacing the viscous, heat settable meat emulsion from cross sealing zones and for transversely sealing the film tube at said cross sealing zones to provide substantially hermetically sealed individual slice packages, and means for heat setting the viscous, heat settable meat emulsion in slice form in said sealed individual slice packages while compressing opposing sides of the respective slice to maintain the shape of said processed meat slices during coagulation thereof. The apparatus may also include means for cooling the sealed individual slice packages, preferably while compressing opposing sides of the respective packages, and means for overwrapping a stacked plurality of the sealed individual slice packages with a substantially gas impervious wrapping material to form a multislice package.

Having generally described various aspects of the present invention, the invention will now be more particularly described with reference to the specific embodiments of processing apparatus illustrated in FIGS. 1-6.

Figures 1, 5:
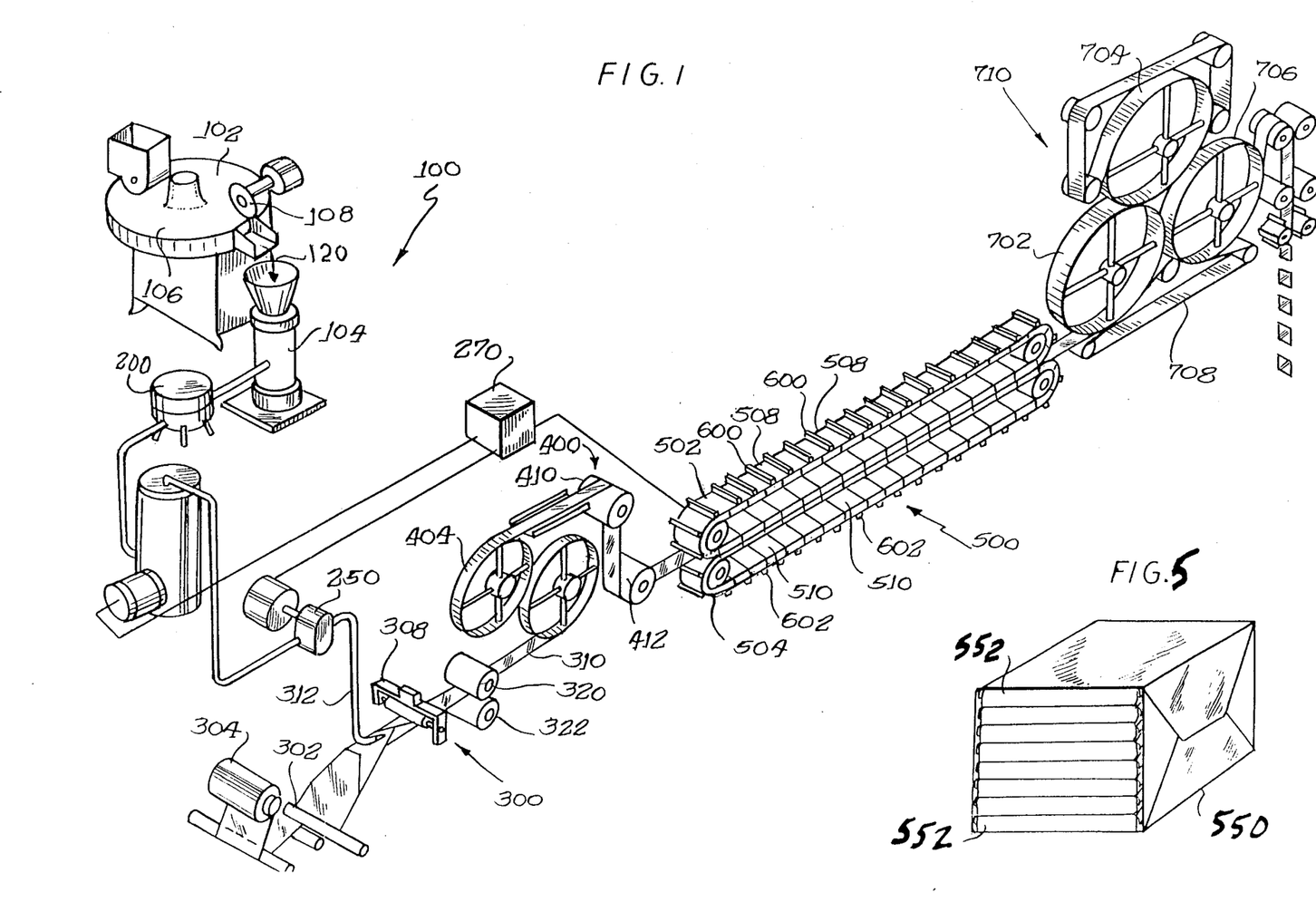
FIG. 1 is a perspective, semi-schematic view of apparatus for manufacturing pasteurized, form stable single slice meat products in accordance with an embodiment of the present invention.
FIG. 5 is a perspective view, partially broken away, of an overwrapped consumer package containing a plurality of individually wrapped meat slices in accordance with the present invention.

As shown in FIG. 1, the embodiment 100 of individually wrapped single slice meat product manufacturing apparatus comprises means 102 for comminuting the meat emulsion components to provide a finely divided meat slurry. In the illustrated embodiment 100, the comminuting means may comprise a conventional food chopper 102 of the type utilized for manufacture of meat emulsions such as a Type K123S/722825 chopper blender fitted with six blades, manufactured by Machinen Fabrik Seydelmann of Stutgart, West Germany to perform the initial comminution of the meat product and may be used in combination with a meat emulsifier 104, such as a Model D Mincemaster Emulsifier manufactured by Griffiths Laboratories, Inc. of Chicago Ill., having a Model #200-1.4 cuttng die.

As shown in FIG. 1, the meat chopper apparatus may comprise a toroidal vessel 106 of a suitable material such as stainless steel which is adapted to revolve along its major toroidal axis. The meat chopper 102 has mounted therein a plurality of knives 108 which rotate at high speed about an axis tangential to the minor toroidal axis while the vessel 106 is rotated, in order to substantially reduce the particle size of formulations placed therein. The meat slurry which is produced by the meat chopper 102 may be introduced into the emulsifier 104, or a colloid mill. The emulsifier 104 forces the meat emulsion through a rotating blade assembly which rotates adjacent a plate having relatively small holes placed therein such that substantially all of the meat product is reduced to very small particle size. In this regard, it is important that the finished meat emulsion should have a uniformly very small particle size so that relatively large particles or fibers do not become trapped within the cross-seal zones upon voiding and cross sealing of the film tube. It is also believed to be important that the fat content be well emulsified in order to provide reliable, uniform cross seals.

In accordance with the illustrated embodiment, the meat emulsion ingredients, which may be of a non-syneresing, heat coagulating bologna composition, are placed in the chopper 102 at a temperature of 35° F. A particularly preferred formulation is as follows:

| Ingredient | Weight Percent |
| --- | --- |
| Beef (90 weight % lean) | 23.02 |
| Pork (50 weight % lean) | 53.72 |
| Water/Ice | 14.00 |
| Corn Syrup Solids - 42DE | 2.00 |
| Salt | 2.61 |
| Spice & flavoring ingredients | 0.121 |
| Dextrose | 2.00 |
| Ascorbic Acid | 0.055 |
| Sodium Nitrite | 0.012 |
| Heat-activated Starch | 2.40 |
| Sodium Tripolyphosphate | 0.05 |

The emulsion composition is chopped in the chopper at a temperature no greater than 55° F. The chopped composition is passed through the emulsifier at a discharge temperature no greater than 65° F. The stability and quality of the meat emulsion are believed to be important in the reliable provision of uniform and effective cross seals for the individual packages.

The resulting meat emulsion has a protein content of about 12 weight percent, a fat content of about 30 weight percent and a moisture content of about 48 weight percent, based on the total weight of the emulsion. The heat-activated starch is a modified starch refined from waxy corn, marketed by National Starch and Chemical Corporation under the trade designation FIRMTEX. The meat emulsion components are chopped sufficiently to provide a chopped composition having a smooth toothpaste like conssstency, and the chopped composition is introduced into the Mincemaster emulsifier to fully homogenize and emulsify the meat components. Other types of emulsifiers, such as those utilizing two counter-rotating plates or blades may also be utilized to provide a meat emulsion for use in accordance with the present invention.

The resulting unioorm, non-syneresing, heat coagulatable emulsion 120 is subsequently deaerated and pumped to processing control pressures by deaeration apparatus 200 and pumping apparatus 202. The deaeration and pumping apparatus evacuate and pump the heat settable emulsion to a single-slice meat emulsion film tube forming station, as will be explained in more detail hereinafter. The deaeration and pumping apparatus 200 may include a vacuumizer such as a Stephan Vacuumizing Mixer Type UM/8C40-Pilot which may be employed to thoroughly deaerate the emulsified blend produced by the emulsifier 104. The blend may be subjected to a vacuum of about 28 inches of meruury in the deaerator 200, over several periods of slow mixing operation followed by quiesence over a total time perood of, for example, about minutes. The deaerated blend may be placed in a single stroke cylindrical stuffer pump 202, such as Model ESG-30 Stuffer manufactured by Talleres Cato, S.A. comprising a cylinder and single stroke piston which may be driven to force the thoroughly deaerated meat emulsion to a metering pump 250 without substantially working or shearing the emulsion.

Two single stroke cylinder systems may be alternately used to provide a continuous supply of deaerated emulsion to the metering pump 250. Generally, a vacuum of greater than about 28 inches of mercury may desirably be utilized for deaeration of the meat emulsion. For example, a sealed mixer under 28 inches of mercury vacuum for 3 minutes has successfully been utilized to deaerate the emulsion, followed by piston/-cylinder pumping of the emulsified, deaerated product to the packaging station. Other apparatus suitable for continuous deaeration may also be used to deaerate the emulsion. For example, deaeration apparatus of the type described in U.S. Pat. No. 3,765,090 having a pair of cams with spiral grooves and lands, may be utilized to establish a series of continuously forward moving pockets which accept the meat emulsion, subject it to vacuum conditions, and deliver it at the discharge end of the housing at a positive discharge pressure. However, the flow rate of the emulsion through such apparatus 200 should be adjusted to correspond to the speed of the packaging unit to prevent overworking of the emulsion, which may produce fat separation or other causes for unreliable cross seal formation.

The deaerated meat emulsion produced by the deaeration apparatus 200 is discharged under positive rressure to positive metering pump 250. The metering pump 250 is adapted to discharge the meat emulsion at a precisely controlled rate to an extruding nozzle of the film forming station 300. The positive metering pump 250 may desirably be varied in its pumped output under automatic or operator control in conjunction with the operation of the extruding nozzle and film forming station 300. In this regard, controller 270 may function to sense and coordinate the operation of the various components of the system.

The extruding nozzle and film forming station 300 comprises a film dispensing apparatus 302 for a continuous roll of transparent or semi-transparent, heat sealable wrapping material 304. The wrapping material is continuously formed into a tube 306 which is longitudinally sealed by longitudinal heat sealer 308 to form a continuous, longitudinally sealed tube 310 of substantially constant diameter.

The viscous, heat settable meat emulsion is discharged into the formed, longitudinally sealed film tube by means of extrusion nozzle 312. The rate of introduction of the deaerated, uncoagulated meat emulsion into the film tube is coordinated with the forward motion of the film tube to provide steady state operation of the system. Sizing rolls 320, 322 may be provided to flatten the longitudinally sealed film tube and enclosed heat settable meat emulsion to a desired product thickness, which will generally be in the range of from about 1/16 to about 3/16 in the illustrated embodiment. A "bead" of the meat emulsion may be maintained ahead of the rollers 320, 322 to insure the uniform filing of the tube. Sterile air, nitrogen or carbnn dioxide may also be introduced into the extrusion zone upstrea (toward the roll 304) of the point of introduction of the meat emulsion) if desired, in order to maintain a counter current packaging atmosphere. The filling and flattening of the film tube may provide anisotropic orientation of the very fine meat fibers of the meat emulsion along one or more directions in the plane of the flattened sheet. Such orientation may provide the finished meat slice with anisotropic properties, such as chewiness and substantially firmer textures in one direction in the plane of the slice than in a direction in the plane perpendicular thereto.

Figure 3:
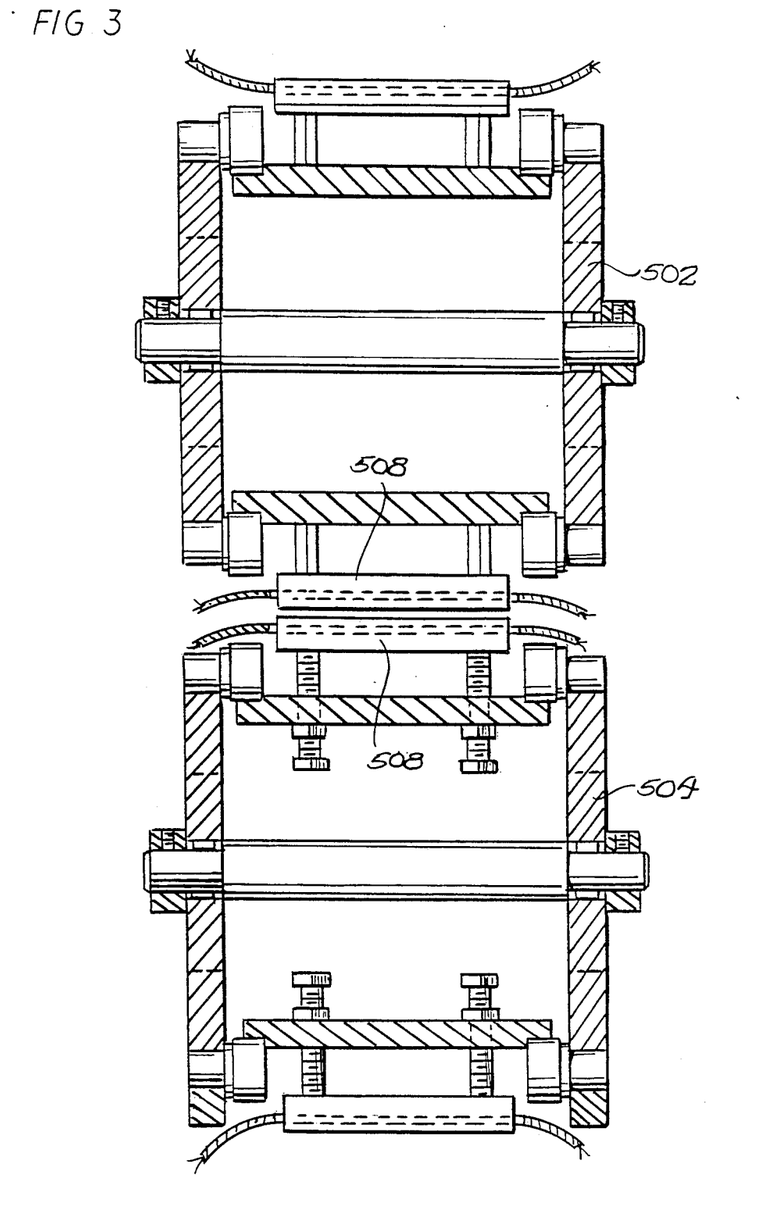
FIG. 3 is an end view, taken along line 3—3, of the input end voider-sealer compression heat setting apparatus of FIG. 2.
Figure 4:
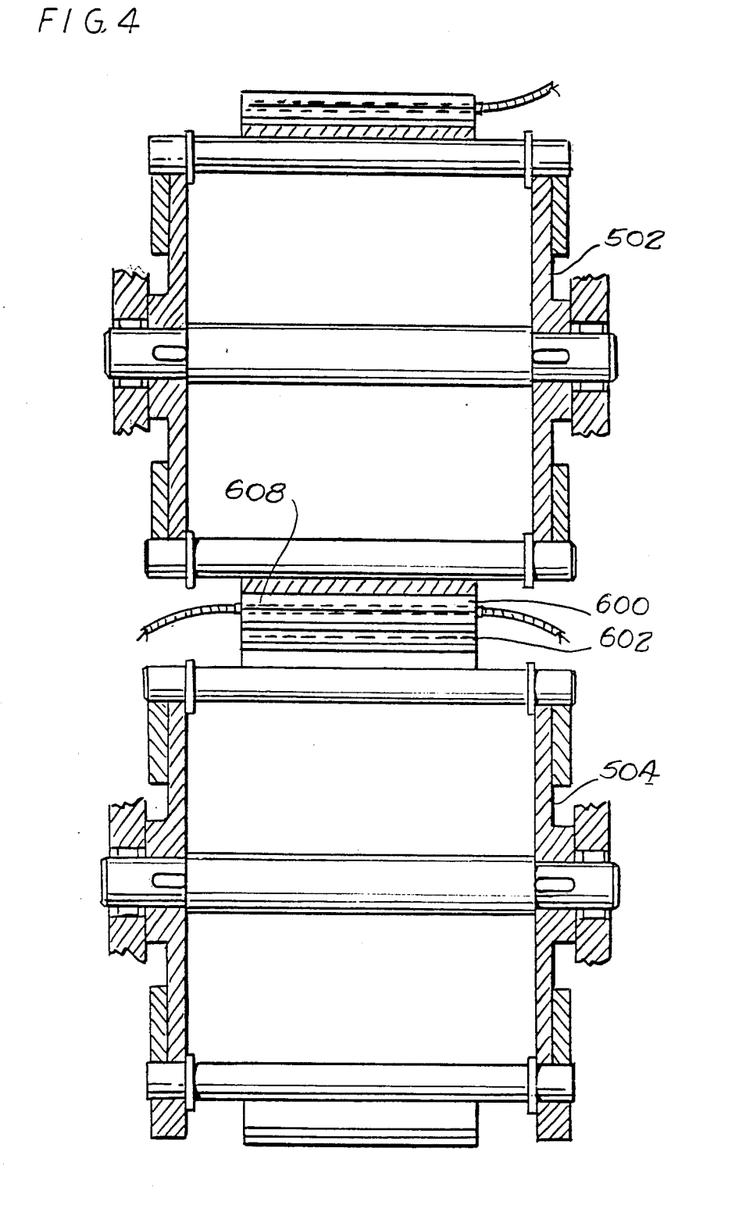
FIG. 4 is an end view, taken along line 4—4 of the discharge end of the voider-sealer compression heat setting apparatus of FIG. 2.

The flattened longitudinally sealed film tube 310 which is substantially filled throughout its cross section with the viscous, deaerated meat emulsion, is pulled through the film forming station 300 by means of a plurality of at least two film pulling wheels 402, 404 of film pulling and thermal conditioning station 400. In this regard, the film 310 is in linear alignment with the film forming station axis, the sizing rolls 320, 322, and the tangential point of contact of the film with the roll 402. The longitudinally sealed emulsion-containing tube 310 first contacts the driving and thermal conditioning wheel 402 adjacent its longitudinally sealed side, is carried around the wheel 402 for more than 180° of its circumference, and subsequently contacts the driving and thermally conditioning wheel 404 with its flat side opposite its longitudinal side. In the illustrated embodiment 400, the longitudinally sealed film tube similarly remains in contact with the wheel 404 for over 180° of its circumference. The wheels 402, 404 are relatively large, and are intended to provide extended contact for uniform tensile development and uniform heat conduction over an extended period of time. The wheel 402 may desirably be heated to a temperature in the range of from about 100° F. to about 140° F. by means of hot water circulated within the wheel structure. Upon laaving the wheel 402, the opposite side of the filled film tube 310 is conducted into contact with the outer surface of film pulling and thermal conditioning wheel 404, which similarly may be heated to a temperature in the range of from about 120° F. to about 140° F. Upon discharge from the film pulling and thermal conditioning wheels 402, 404, the temperature of the film tube and the meat emulsion will desirably be raised to an elevated temperature in the range of from about 110° F. to about 140° F. However, it is important that the meat emulsion not be coagulated to a substantial degree upon its discharge from the film pulling and heat conditioning station 400. Upon diccharge from the film pulling wheel 404, the thermally conditioned film tube and meat emulsion product may be conducted over various idler and alignment wheels 410, 412 in order to achieve proper alignment with voiding, sealing and pasteurizing station 500, which is illustrated in more detail in FIGS. 2–4.

Figure 2:
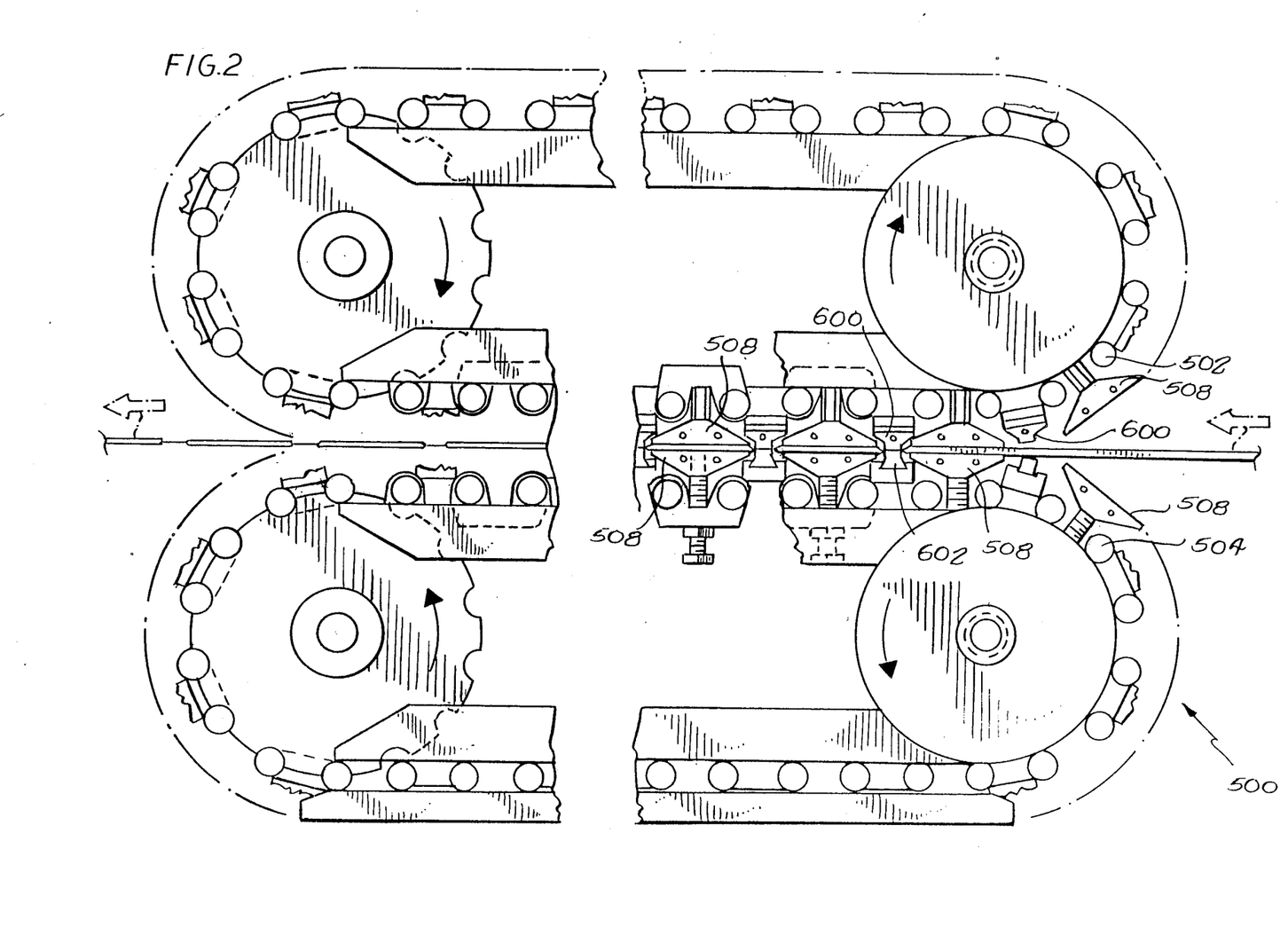
FIG. 2 is a side view, partially broken away, of the voider-sealer compression/heat setting apparatus of the system of FIG. 1.

As shown in FIGS. 1 and 2, the longitudinally wrapped meat emulsion ribbon may be transported from one or more suitably aligned rollers 410, 412, to enter the voiding, sealing and pasteurizing apparatus 500. The apparatus 500 comprises two opposing arrays 502, 504 of sealing elements and voiding elements, respectively arranged and interconnected in the form of belts which may be driven in registration at relatively high speed. In the sealing belt arra 502, a plurality of sealing bars 600 alternately arranged with flattening plate elements 508 are connected in an endless belt arrangement. Similarly, in the voiding element array 504, a plurality of spaced apart elastomeric voiding elements 602 similarly separated by flattening plates 510 are connected to form an endless belt of substantially identical length. In the illustrated embodiment 500, the sealing belt array 502 comprises a plurality of sealing bar units and corresponding flattening plate units alternating therewith, the number of which will be a function of the processing speed and appropriate dwell time. Similarly, the voiding belt array 504 comprises a plurality of elastomeric voiding elements 602 and a corresponding number of flattening units alternating therewith, these elements being regularly and continuously opposed along the entire length of the respective belts. The sealing bar elements 600 and the voiding elastomeric elements 602 are regularly spaced apart along the longitudinal axes of their respective belts 502, 504 at a distance corresponding to the desired length of the finished single-slice meat emulsion product packages, and are maintained in opposed alignment by suitable drive mechanisms, including drive elements for the respective belt arrays 502, 504. The sealing bars and elastomeric voiding elements should be capable of substantially completely voiding the meat emulsion from the seal zone, and may be constructed in accordance iith the teachings of U.S. Pat. No. 4,586,317.

In operation, the sealing bar belt 502, and the voiding rubber belt 504 are driven such that the film wrapped meat emulsion ribbon 310 is pulled therebetween at a rate of linear film tube travel corresponding to the rate at which the longitudinally sealed film tube is formed and pulled through the film forming station 500, and the film pulling and thermal conditioning station 400. The belts 502 and 504 are maintained under suitable compression in respect to each other, so that the respectively opposing sealing and voiding elements 602, 600 are forced into compression with the meat emulsion containing longitudinally sealed film tube 310 therebetween at a contact pressure in the range of from about 150 to about 600 pounds per square inch of contact area, and preferably in the range of from about 250 to about 400 psi. In the illustrated embodiment 10, a plurality of sealing bar-voiding elements of the respective belts 502, 504 are in such compressive contact in order to provide a suitable dwell time for processing, with several additional sealing-voiding pairs at the input and discharge ends of the belts 522, 504, respectively undergoing compression and decompression. By the operation of the sealing bar and voiding elmments, the uncoagulated viscous meat emulsion is displaced from the zone of contact of these elements as they are progressively compressed against the respective sides of the film tube 310 upon entry into the voiding, sealing and pasteurizing station 500. The continuing compression of the film tube between the heated sealing elements and the voiding elements provides for cross sealing of the film tube into a series of individual packets each containing a portion of the viscous meat emulsion. In this regard, it is noted that upon reaching a heat set, or fully coagulated state, the meat emulsion may not be reliably displaced from the cross seal area to permit the formation of reliable and uniform cross seals, and furthermore may not be uniformly redistributed in the remaining package volume as a uniform sheet of substantially uniform thickness. Accordingly, it is important that at the time of entry into the voiding apparatus 500, the meat emulsion not be substaniially fully coagulated, and should best be substantially fully uncoagulated. In this regard, it may be desirable to maintain the temeerature of the meat emulsion in the film tube 310 at a temperature below the coagulation temperature of the meat emulsion at the time of entry into the voiding station 500, particularly at slow opertting speeds of the apparatus. In view of the time-temperature relationship for full coagulation, it will also be appreciated that at higher operating speeds, the temperature of the emulsion at the point of entry to the voiding and sealing station 500 may be increased while still providing for the desired displacement of the meat emulsion before it reaches a fully heat set condition.

As indicated, the meat emulsion should be fully removed from the sealing area, and the minutely cross channeled surface configuration of the sealing bar elements is particularly adapted to effect such removal and form an effective cross seal. The illustrated sealing bar elements 600 comprise a body which may be fabricated from a relatively hard metallic material such as nickel steel, having a substantially flat, minutely cross channeled contact surface. The bar 600 may be mounted on the conveying belt 502 of the sealing apparatus 500 by the illustrated mounting holes and is heated to a desired cross sealing temperature by an appropriate electrical resistance heating element disposed within a recess 608 on the belt-coupling side of the sealing bar.

As indicated, the sealing bar elements 600 are maintained at a predetermined elevated temperature which is suitable for sealing the thermoplastic film layer under the time-pressure conditions utilized in the process. Conventional heating elements and control apparatus (not shown) may be used for this purpose. In the illustrated embodiment, the sealing bar temperatures may be maintained at a relatively low temperature in the range of from about 200° to 250° F. The use of relatively low seal bar temperatures may prevent localized coagulation of the meat emulsion adjacent the packaging film surface which might adversely affect cross seal formation. It is noted that the heated sealing bar 600 should not melt the outer layer or layers of the organopolymeric wrapping material, but of course, should melt the inner, sealing layer of the wrapping material sufficiently to effect the establishment of an effective and uniform cross seal. In addition, the seal bar should not heat the meat emulsion upon initial contact between the film and the sealing bar to a temperature at which the emulsion is sufficiently heat set that voiding of the emulsion from the cross sealing zone is adversely impeded to the detriment of effective cross sealing.

As the meat emulsion filled film tube 310 travels into the sealing system 500, a sealing bar element of the sealing belt 502 and a correspondingly aligned, opposing elastomeric voiding element of the voiding element belt 504 are respectively brought into contact with the meat emulsion containing packaging film sheet, and rapidly force the viscous meat emulsion from the zone separating the elements as they are brought together by the operation of the belts 502, 504. Because the surface of the voiding element 602 is convex, the meat emulsion is progressively displaced from the initial point of contact of the curved elastomeric voiding element 602 until the sealing bars and respectively opposing voiding elements are maintained in maximum compressive contact with the packaging film therebetween. The belt sealing bars corresponding to the belt voiding element sections are cammed against respective pressure plates in order to maintain a steady compressive force therebetween.

Following the voiding of the viscous, uncoagulated meat emulsion from the cross seal area, the meat emulsion in the individual packages formed may be fully heat set and pasteurized. In this regard, the flattening plate, compression elements 508 serve to redistribute the viscous meat emulsion which is displaced from the seal area to form a meat emulsion layer within the package units of substantially uniform thickness, prior to such heat setting and pasteurization. The compression elements are separated at a predetermined distance generally corresponding to the desired thickness of the individually wrapped meat slice packages, and may be adapted to maintain the package elements contained therebetween under a substantially uniform pressure of at least about 25 pounds per square inch. The individual package elements are subsequently heated to a pasteurization temperature of at least about 155° F. in order to pasteurize and fully heat set the meat emulsion in the form of uniform slices within the fully sealed individual packages which have been previously formed and sealed around the viscous meat emulsion. The meat emulsion may be heated and pasteurized in the illustrated voiding, sealing and pasteurizing staiion in any suitable manner. For example, the compression plates may be heated by suitable electric resistance elements to a desired temperature to effect heat setting and pasteurization. Alternatively, the compression plates may be fabricated of a microwave transparent material such as heat-tempered glass or ceramic, and the packages may be subjected to microwave heating upon transit through the station 500. Other suitable heating mechanisms may also be used.

The sealing bar elements and the corresponding elastomeric voiding elements are progressively brought together and maintained in compressive contact for the duration of travel through the sealing station apparatus 500 to provide the desired dwell time for pasteurization, until the discharge end of the sealing apparatus is reached, where the belts, by a similarly inclined camming plate gradually separate the sealing bars and voiding elements for their return travel to the top of the sealing station to reengage the film tube 310 at the proximate, voiding end of the station 500.

Upon emerging from the discharge end of the sealing station 500, the package film has been transversely sealed at spaced apart intervals corresponding to the spacing intervals of the sealing bars 600 and opposing voiding elements 602 of the belts 502, 504. The continuous, transversely sealed film formed thereby is subseuuently conducted to a cooling station 700 at which the cross sealed, heat set, cross sealed packages are conducted around a series of cooling wheels 702, 704, 706 to reduce the temperature of the individually wrapped slices to about 80° F. or less. The wheels may be cooled by a continuously circulating coolant which is pumped through the wheel structure. At about 70° F. or less, the slices are more easily stacked and overwrapped by packaging equipment, and accordingly, it is desirable to cool the packages to such lower temperatures on the cooling wheels, or by subsequent cooling. It is important to maintain the sealed packages under compressive force during cooling to maintain the flat uniform shape of the individually wrapped slices. In this regard, a compression belt system 710 may be provided to compress the slices against the cooling wheels. Alternatively, a processing station similar to station 500 may be provided immediately adjacent, and in registration with, station 500, which comprises a plurality of compression cooling faces (rather than heating faces) to cool the hermetically sealed slices. Other manufacturing techniques may be utilized provided that the meat emulsion is fully displaced from the cross seal zone, that reliable and uniform cross seals are made to enclose the meat emulsion before it is fully heat set, and that the enclosed meat emulsion is maintained under compression during heat setting or pasteurization, and preferably also during cooling. In this regard, for example, a cross sealing station 500 which cross seals but does not heat set or pasteurize the enclosed emulsion in the individual packages may be followed by means for heating the packages under compression without damaging the packages or package seals. For example, belt-compression heating wheel systems like the system 702, 704, 706, 708, 710 of FIG. 1 may be adapted for such heat setting under compression. However, the amount of compression necessary to maintain the shape of the packages during heat-setting (which may approach 25-30 psi or more for certain types of emulsions) may damage the film material or the cross seals unless properly registered and symmetrical package support therefor is provided by the compression belt and heating wheel assembly. The packages may subsequently be cooled under compression in a suitable cooling apparatus.

The cooled slices are subsequently conducted to a transverse cutting and packaging station 800 which may be of conventional design in which the film tube slices are transversely cut at approximately the center of the cross seals to provide individual packages. The entire apparatus and its corresponding cutting station may be operated continuously at relatively high speed to provide flat, undistorted individually wrapped, hermetically sealed, pasteurized, form stable meat product slices with package cross seals of desirable uniform strength and integrity and having excellent bacteriological stability.

The individual slice packages may be stacked in layers of from about 3 to about 25 or more slices, and overwrapped with a suitable, preferably substantially gas impermeable packaging material which forms a substantially hermetically sealed package 550 around the individual slices 552 as shown in FIG. 5. Such overwrap packaging may be carried out in accordance with conventional packaging practice, there being a wide variety of packaging methods and materials which are suitable for carrying out such overwrap packaging. The sealed, overwrapped package provides the consumer with a sealed unit containing a plurality of individually wrapped meat slices which have each been fully pasteurized within their respectively sealed, protective film enclosures from which they are not removed from the time of pasteurization until needed by the consumer.

By extending the width of the sealing station 500, multiple film tubes 310 may be processed, thereby multiplying the production rate of individually wrapped packages.

While the present invention has been particularly desciibed with reference to various specific embodiments, it will be appreciated from the present disclosure that various adaptations and modifications ma be made which are within the spirit and scope of the present invention.

What is claimed is:

1. A method for continuously manufacturing individually wrapped, single slice, firm bodied meat products comprising the steps of preparing a viscous, heat settable, non-syneresing meat emulsion, comprising from about 25 to about 65 percent total solids and from about 35 to about 75 percent water, said solids comprising at least about 5 percent protein, at least about 5 percent animal or vegetable fat, and up to about 5 percent by weight of a heat settable starch having a gelation temperature in the range of from about 80° F. to about 180° F., based on the total weight of the meat product emulsion, continuously forming a longitudinally sealed packaging material tube from a substantially gas impervious packaging material, continuously introducing the meat emulsion into the packaging material tube, continuously flattening the meat emulsion and packaging material tube and enclosed heat-settable meat emulsion prior to gelation of said starch to a thickness in the range of from about 1/16th to about 3/16th inch and a width of from about 2 to about 5 inches, to provide a flattened, continuously advancing, non-syneresing meat emulsion containing, substantially gas impervious film tube, continuously repetitively displacing the viscous heat settable meat emulsion from a cross sealing zone of the continuously advancing flattened packaging material tube and transversely sealing the packaging material tube to provide a successive plurality of sealed packages each containing the meat emulsion in sheet form, and continuously repetitively heating the respective meat emulsion of each of said successive plurality of sealed packages while compressing at least two opposing sides of each of the sealed packages to gel said starch and pasteurize and heat-set the meat emulsion contained in each sealed package, said compressing being carried out by subjecting the meat emulsion to a compressive force of at least about 5 pounds per square inch, applied by substantially flat, opposed parallel surfaces, while heat-setting the emulsion, to provide a plurality of flat, firm bodied, form-stable, heat coagulated single slice meat products each intimately surrounded by and in conforming contact with a surrounding, sealed, substantially gas impermeable package formed of said packaging material.

2. A method in accordance with claim 1 wherein said meat emulsion has a heat setting temperature in the range of from about 120° F. to about 140° F. and wherein said gelation temperature of said starch is below said heat setting temperature.

3. A method in accordance with claim 1 wherein the emulsion is extruded through a discharge nozzle adjacent a zone of continuous film formation to form a continuous, longitudinally sealed packaging film having the viscous, heat-settable meat emulsion enclosed therein.

4. A method in accordance with claim 1 further comprising the step of cooling the heat set emulsion and subjecting the meat emulsion to a compressive force of at least about 5 pounds per square inch, applied by substantially flat, opposed parallel surfaces, while cooling the heat set emulsion.

5. A method in accordance with claim 1 wherein said heating of the meat emulsion is carried out by pasteurizing the meat emulsion within a substantially hermetically sealed, individually wrapped single slice package at a temperature of at least about 155° F. for at least about 1 second or equivalent time/temperature conditions.

6. A method in accordance with claim 1 wherein the individually wrapped meat slices are subsequently stacked and overwrapped with an additional packaging material to provide a hermetically sealed overwrapped multislice consumer product.

7. A method in accordance with claim 1 wherein said meat emulsion is a non-syneresing emulsion comprising from about 0.05 to about 5.0 weight percent based on the total weight of the emulsion, of a heat settable starch having a gelation temperature lower than the temperature to which the emulsion is heated.

8. A method in accordance with claim 7 wherein said emulsion is substantially free of visible meat fibers.

9. A method in accordance with claim 6 wherein said meat emulsion comprises from about 7 to about 16 weight percent meat or vegetable protein, from about 20 to about 50 percent fat, from about 0.01 to about 0.5 weight percent of an edible tripolyphosphate salt.

* * * * *

UNITED STATES PATENT AND TRADEMARK OFFICE
CERTIFICATE OF CORRECTION

PATENT NO. : 4,792,457

DATED : December 20, 1988

INVENTOR(S) : Miro A. Brna, etal

It is certified that error appears in the above-identified patent and that said Letters Patent is hereby corrected as shown below:

On the face of the patent, under the headings "References Cited" and "U.S. Patent Documents" insert the following:

3,495,992 - 2/1970 - DeFor...426/412
   3,688,468 - 9/1972 - Erekson...53/550
   3,913,299 - 10/1975 - Stenstrom...53/550
   4,015,021 - 3/1977 - Harima, etal...426/130
   4,046,923 - 9/1977 - Meng, etal...426/129
   4,183,964 - 1/1980 - Vinokur...426/412
   2,226,422 - 12/1940 - Rumsey...53/450

On the face of the patent, under the heading "References Cited" insert the following heading "Foreign Patent Documents" and, under that heading, insert:

553,332 - 2/1958 - Canada...426/414
   899,176 - 6/1962 - Canada...426/414

On column 1, line 22, change "coagualtion" to --coagulation--.

On column 1, line 32, change "practic" to --practice--.

On column 1, line 49, change "add" to --and--.

On column 2, line 17, change "apparatusaare" to --apparatus are--.

On column 3, line 11, change "wight" to --weight--.

On column 3, line 38, change "tripolyphosphateiincreases" to --tripolyphosphate increases--.

UNITED STATES PATENT AND TRADEMARK OFFICE
CERTIFICATE OF CORRECTION

PATENT NO. : 4,792,457

DATED : December 20, 1988

INVENTOR(S) : Miro A. Brna, etal

It is certified that error appears in the above-identified patent and that said Letters Patent is hereby corrected as shown below:

On column 4, line 26, change "temperauure" to --temperature--.

On column 4, line 42, change "starc" to --starch--.

On column 5, line 50, change "filmtube" to --film tube--.

On column 5, line 62, after "1/16" delete "the".

On column 5, line 63, after "3/16" delete "this."

On column 7, line 25, change "cuttng" to --cutting--.

On column 8, lines 9-10, change "emu-sion" to --emulsion--.

On column 8, line 15, change "conssstency" to --consistency--.

On column 8, line 22, change "unicorm" to --uniform--.

On column 8, line 34, change "meruury" to --mercury--.

On column 8, line 36, change "quiesence" to --quiescence--.

On column 8, lines 36 and 37, change "pe-rood" to --period--.

On column 8, line 37, after "about" insert --3--.

On column 9, lines 2 and 3, change "rressure" to --pressure--.

On column 9, line 34, change "carbnn" to --carbon--.

On column 9, line 35, change "upstrea" to --upstream--.

UNITED STATES PATENT AND TRADEMARK OFFICE
CERTIFICATE OF CORRECTION

PATENT NO. : 4,792,457
DATED : December 20, 1988
INVENTOR(S) : Miro A. Brna, etal It is certified that error appears in the above-identified patent and that said Letters Patent is hereby corrected as shown below:

On column 9, line 36, delete ")".

On column 10, lines 2 and 3, change "leaaing" to --leaving--.

On column 10, line 15, change "diccharge" to --discharge--.

On column 10, line 29, change "arra" to --array--.

On column 10, line 48, change "axes" to --axis--.

On column 10, line 56, change "iith" to --with--.

On column 11, line 10, change "522" to --502--.

On column 11, line 12, change "elmments" to --elements--.

On column 11, line 30, change "substaniially" to --substantially--.

On column 11, line 32, change "temeerature" to --temperature--.

On column 11, line 36, change "opertting" to --operating--.

On column 12, line 54, change "staiion" to --station--.

On column 13, lines 12 and 13, change "subseuuently" to --subsequently--.

UNITED STATES PATENT AND TRADEMARK OFFICE
CERTIFICATE OF CORRECTION

PATENT NO. : 4,792,457

DATED : December 20, 1988

INVENTOR(S) : Miro A. Brna, etal

It is certified that error appears in the above-identified patent and that said Letters Patent is hereby corrected as shown below:

On column 14, line 22, change "desiibed" to --described--.

On column 14, line 24, change "ma" to --may--.

Signed and Sealed this

Sixteenth Day of May, 1989

Attest:

DONALD J. QUIGG

Attesting Officer

Commissioner of Patents and Trademarks